United States Patent Office 3,082,214
Patented Mar. 19, 1963

3,082,214
CHEMICAL COMPOSITIONS AND PROCESS
Henry Bluestone, University Heights, Ohio, assignor to Diamond Alkali Company, Cleveland, Ohio, a corporation of Delaware
No Drawing. Filed Sept. 4, 1958, Ser. No. 758,905
10 Claims. (Cl. 260—327)

The present invention relates to compounds of the structure:

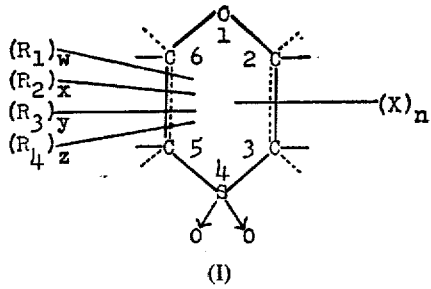

(I)

wherein X is halogen, i.e., fluorine, chlorine, bromine, and/or iodine, chlorine being preferred; $R_1$ is an alkyl radical, such as methyl, ethyl, propyl, butyl, and the like, and their isomers, $R_2$ is an aryl radical, such as phenyl or naphthyl; $R_3$ is an alkaryl radical, e.g., a tolyl or xylyl radical, $R_4$ is an aralkyl radical, such as a benzyl or phenethyl radical; $n$ is a number from 1 to 8, inclusive, e.g., 1 to 4; $w$, $x$, $y$, and $z$ are numbers from 0 to 7, inclusive, any free bonds being satisfied by hydrogen; and to the preparation and application of such compounds.

As indicated in the various structures throughout the specification and claims the dotted lines between carbons or leading away from carbon atoms indicate alternative bonds. As an example, in structure I the dotted lines between the carbon atoms in the 2 and 3 positions and the dotted lines leading away from these carbon atoms indicate that in this structure there may be a double bond between the carbons in the 2 and 3 positions or these carbons may have two free bonds to be satisfied by either hydrogen or one of the indicated substituent groups.

More specifically, the compounds of the present invention may be represented by the structure:

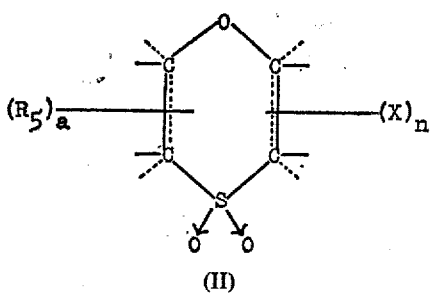

(II)

wherein X is halogen, preferably chlorine, $R_5$ is a lower alkyl radical, e.g., methyl, ethyl, propyl, and their isomers, $a$ is a number from 0 to 4, inclusive, e.g., 0 to 2, and $n$ is a number from 1 to 8, inclusive, e.g., 1 to 4, any free bonds being satisfied by hydrogen.

Preferred illustrative halooxathianes of this invention, specifically polychlorooxathiane-4,4-dioxides may be represented by the structure:

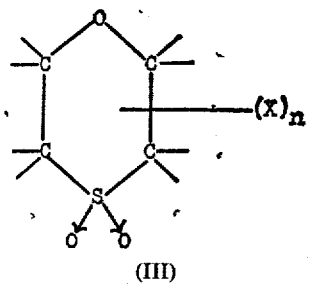

(III)

wherein X is halogen, preferably chlorine, $n$ is a number from 1 to 8, inclusive, e.g., 1 to 4, any free bonds being satisfied by hydrogen.

Another embodiment of this invention are halooxathiene-4,4-dioxides, such as polychlorooxathiene-4,4-dioxides, which may be represented by the structure:

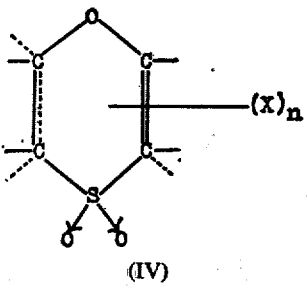

(IV)

wherein X is halogen, chlorine being preferred, $n$ is a number from 1 to 6, inclusive, e.g., 1 to 4, any free bonds being satisfied by hydrogen. Preferred p-oxathiane-4,4-dioxides within the scope of this invention are:

2,6-dichloro-p-oxathiane-4,4-dioxide
2,3,6-trichloro-p-oxathiane-4,4-dioxide
2,3-dichloro-p-oxathiane-4,4-dioxide
2,6-dibromo-p-oxathiane-4,4-dioxide
2,3-dibromo-p-oxathiane-4,4-dioxide
2,3,6-tribromo-p-oxathiane-4,4-dioxide
2-chloro-6-methyl-p-oxathiane-4,4-dioxide
2-phenyl-6-bromo-p-oxathiane-4,4-dioxide
2-bromo-5-chloro-p-oxathiane-4,4-dioxide
5-benzyl-2-chloro-p-oxathiane-4,4-dioxide
2-chloro-p-oxathiane-4,4-dioxide
2-bromo-p-oxathiane-4,4-dioxide
2,5-dichloro-p-oxathiane-4,4-dioxide Specific substituted p-oxathiene-4,4-dioxides within the scope of this invention are:

2-chloro-p-oxathiene-4,4-dioxide
2-bromo-p-oxathiene-4,4-dioxide
2,3-dichloro-p-oxathiene-4,4-dioxide
2-methyl-6-chloro-p-oxathiene-4,4-dioxide
2,5-dichloro-p-oxathiene-4,4-dioxide Illustrative p-oxathiin-4,4-dioxides of this invention are:

2,3-dibromo-p-oxathiin-4,4-dioxide
2,3,6-trichloro-p-oxathiin-4,4-dioxide
2,3-dichloro-p-oxathiin-4,4-dioxide
2,6-dibromo-p-oxathiin-4,4-dioxide 2-chloro-p-oxathiin-4,4-dioxide
2-bromo-p-oxathiin-4,4-dioxide
2,6-dichloro-p-oxathiin-4,4-dioxide Compounds within the scope of generic structure I above may be prepared by chemically reacting a compound of the structure:

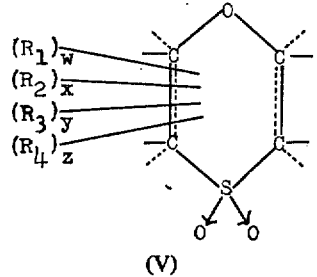

(V)

wherein $R_1$ is an alkyl radical, $R_2$ is an aryl radical, $R_3$ is an alkaryl radical, $R_4$ is an aralkyl radical, and $w, x, y,$ and $z$ are numbers from 0 to 7, inclusive, any free bonds being satisfied by hydrogen; with a halogenating agent, such as free halogen, i.e., chlorine, bromine, fluorine, and/or iodine, iodine monochloride, N-bromosuccinimide, thionyl chloride, sulfuryl chloride, or the like. The halogenation reaction may be carried out at a temperature of about 0° to 150° C., e.g., 60° to 120° C., generally at an atmospheric pressure. The reaction requires about ½ to 36 hours, usually about 2 to 3 hours, and typically employs a catalyst to facilitate the reaction. Suitable catalysts are free radical catalysts, e.g., benzoyl peroxide, lauroyl peroxide, or other organic peroxide catalyst, and/or a source of actinic radiation, such as sunlight, and ultraviolet light.

In general, it is ordinarily preferred to employ substantially stoichiometric ratios of the reactants; however, considerable departure from these ratios can be tolerated in many instances without serious detriment to either yields or quality of product. In certain instances, it is desirable to employ a slight excess of the halogenating agent, such as about 10% excess.

The reaction advantageously may be carried out in the presence of a solvent, such as chloroform, trichlorobenzene, perchlorethylene, nitrobenzene, carbon tetrachloride, or the like.

Purification of the product, if desirable, may be accomplished through means common in the art, such as washing and recrystallization from a solvent, such as water, carbon tetrachloride, chloroform, alcohols, e.g., alkanols such as methanol, ethanol, or the like.

Alternatively, compounds within the scope of generic structure I, wherein $n$ is a number from 1 to 6, inclusive, may be prepared by dehydrohalogenating a compound of the structure:

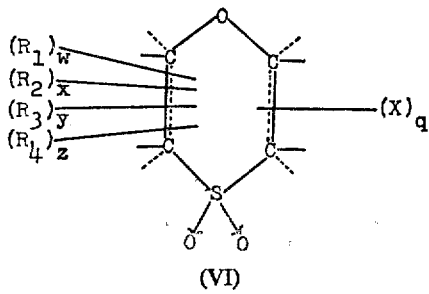

(VI)

wherein X is halogen, $q$ is a number from 2 to 7, inclusive, e.g., 2 to 4; $w, x, y$ and $z$ are numbers from 0 to 6, inclusive, and $R_1, R_2, R_3,$ and $R_4$ are as defined under structure I. This dehydrohalogenation may be carried out by heating a compound of structure VI above and/or by contacting such a compound with a dehydrohalogenating agent, e.g., pyridine, triethylamine, sodium hydroxide, potassium hydroxide, ammonium hydroxide, and the like. In either case, the dehydrohalogenation may be carried out at a temperature of about 20° to 150° C., such as 75° to 125° C., the reaction generally requiring about ¼ to 30 hours, such as ½ to 2 hours.

The preparation is carried out typically in the presence of a solvent, such as water, carbon tetrachloride, benzene, chlorinated benzene, ethylene dichloride, perchlorethylene, and the like.

Isolation of the resulting product may be carried out through washing and recrystallization from a solvent, such as carbon tetrachloride, monochlorobenzene, alcohols, e.g., alkanols such as methanol or ethanol, water, and the like.

Compounds within the scope of generic structure II above may be prepared under essentially the same reaction conditions as disclosed for the preparation of a compound within the scope of generic structure I, by chemically reacting a compound of the structure:

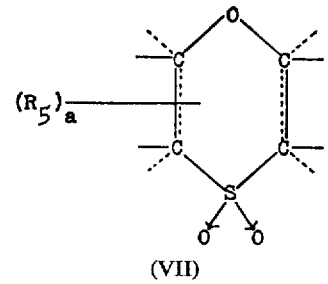

(VII)

with a halogenating agent as previously defined, wherein $R_5$ is a lower alkyl radical, as defined; and $a$ is a number from 0 to 4, inclusive, any free bonds being satisfied by hydrogen.

Alternatively, compounds within the scope of generic structure II above may be prepared by dehydrohalogenating a compound of the structure:

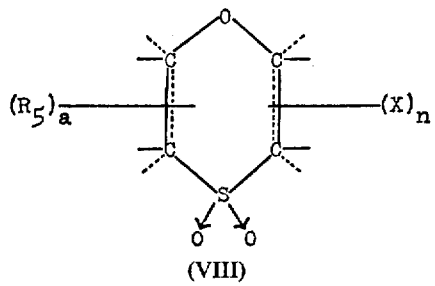

(VIII)

wherein X is halogen, preferably chlorine, $R_5$ is a lower alkyl radical, $a$ is a number from 0 to 4, inclusive, e.g., 0 to 2, and $n$ is a number from 2 to 7, inclusive. This dehydrohalogenation may be carried out under essentially the same reaction conditions as disclosed in the dehydrohalogenation of a compound of structure VI. An illustrative preparation of this type is the preparation of a polychloro-p-oxathiene-4,4-dioxide which comprises chemically reacting a polychloro-p-oxathiene-4,4-dioxide with a dehydrochlorinating agent. This process also may be carried out by heating a polyhalooxathiane-4,4-dioxide of structure III; a temperature above room temperature is normally employed, e.g., 25° to 250° C. An exemplary preparation of this type is that of a polychloro-p-oxathiene-4,4-dioxide which comprises heating, e.g., to a temperature of about 75° to 125° C., a polychloro-p-oxathiene-4,4-dioxide.

Compounds within the scope of generic structure III may be prepared by halogenating, preferably chloroinating, p-oxathiane-4,4-dioxide. This halogenation is carried out under essentially the same reaction conditions as those taught in the halogenation of a compound represented by structure V above.

Alternatively, compounds within the scope of generic structure IV above may be prepared by chemically reacting a compound of the structure:

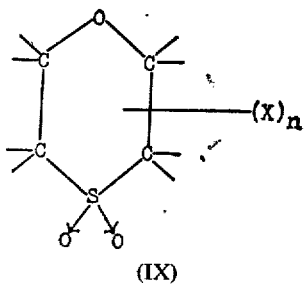

(IX)

wherein X is a halogen atom, preferably chlorine, and $n$ is a number from 2 to 7, inclusive, with a dehydrohalogenating agent, the free bonds being satisfied by hydrogen. The dehydrohalogenation of these polyhalooxathianes may be carried out under essentially the same reaction conditions as that stated in the dehydrohalogenation of a compound of structure VI above.

Compounds within the scope of generic structure IV above may be prepared by dehydrohalogenating a compound of the structure:

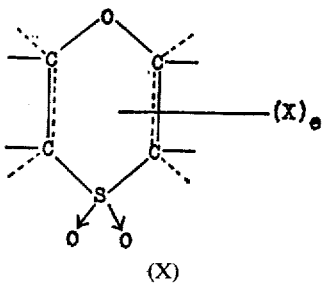

(X)

wherein X is halogen, and $e$ is a number from 2 to 7, inclusive, e.g., 2 to 4. This reaction is carried out under essentially the same reaction conditions as that stated for the dehydrohalogenation of the compound of the generic structure VI above.

Specifically, 2,6-dichloro-p-oxathiane-4,4-dioxide and 2,3,6-trichloro-p-oxathiane-4,4-dioxide may be prepared by chlorinating p-oxathiane-4,4-dioxide under reaction conditions taught in the halogenation of a compound of generic structure V.

Further, 2-chloro-p-oxathiene-4,4-dioxide may be prepared by dehydrohalogenating 2,6-dichloro-p-oxathiane-4,4-dioxide under essentially the same reaction conditions stated in the dehydrohalogenation of a compound represented by structure VI above.

The novel halogen-substituted organic compounds of this invention are useful as chemical intermediates and exhibit a high degree of biological activity in addition to having applications in the fields of high pressure lubricants, petroleum and rubber additives. More specifically, these compounds are active fungicides, such as for the control of blight fungi and the prevention of spore germination, as nematocides, for example in the control of plant and non-plant parasitic nematodes; as bactericides, e.g., for the control of micro-organism growth; and as insecticides, such as for the control of beetles.

While compounds of this invention may be employed in a variety of applications biologically active or otherwise, when employed as biologically-active materials it will be understood, of course, that such compounds may be utilized in diverse formulations, both liquid and solid, including finely-divided powders and granular materials, as well as liquids, such as solutions, concentrates, emulsifiable concentrates, slurries, and the like, depending upon the application intended and the formulation media desired.

These compounds may be used alone or in combination with other known biologically-active materials, such as other organic phosphate pesticides, chlorinated hydrocarbon insecticides, foliage and soil fungicides, pre- and post-emergent herbicides, and the like.

Thus, it will be appreciated that compounds of this invention may be employed to form biologically-active substances containing such compounds as essential active ingredients thereof, which compositions may also include finely-divided dry or liquid diluents, extenders, fillers, conditioners, including various clays, diatomaceous earth, talc, spent catalyst, alumina-silica material, liquids, solvents, diluents, or the like, including water and various organic liquids, such as benzene, toluene, chlorinated benzene, acetone, cyclohexanone, xylene, carbon disulfide, carbon tetrachloride, alcohols, and various mixtures thereof.

When liquid formulations are employed, or dry materials prepared which are to be used in liquid form, it is desirable in certain instances additionally to employ a wetting, emulsifying, or dispersing agent to facilitate use of the formulation, e.g., Triton X–155 (alkyl aryl polyether alcohol, U.S. Patent No. 2,504,064).

The term "carrier" as employed in the specification and claims is intended to refer broadly to materials constituting a major proportion of a biologically-active or other formulation and hence includes finely-divided materials, both liquid and solid, as aforementioned, conveniently used in such applications.

In order that those skilled in the art may more completely understand the present invention and the preferred methods by which the same may be carried into effect, the following specific examples are offered:

EXAMPLE 1

Preparation of 2,6-Dichloro-p-Oxathiane-4,4-Dioxide 10.0 g. (0.074 mol) of p-oxathiane-4,4-dioxide is dissolved in about 500 ml. of benzene. To this solution 105 g. (1.5 mol) of chlorine is added over a period of about two hours at about 70° C. in the presence of strong ultraviolet light. Upon reaction completion, the mixture is cooled, yielding as a solid the desired $C_4H_6Cl_2O_3S$ melting at 110° to 112° C.

EXAMPLE 2

In order to demonstrate insecticidal activity of the products of this invention, male German cockroaches, *Blattella germanica*, 8 to 9 weeks old, are anesthetized with carbon dioxide to facilitate handling and then dipped in a test formulation (2000 p.p.m. product of Example 1—5% acetone—0.01% Triton X–155—balance water) for 10 seconds, removed, and freed of excess liquid, and caged. Two lots of 10 insects each are exposed to this formulation and mortality observations are recorded after 3 days. Using the product of Example 1 at the above concentration, significant insect mortality is observed.

EXAMPLE 3

Spore germination tests on glass slides are conducted via the test tube dilution method adopted from the procedure recommended by the American Phytopathological Society's committee on standardization of fungicidal tests. In this procedure, the product of Example 1 in aqueous formulations at concentrations of 1000, 100, 10 and 1.0 p.p.m. is tested for its ability to inhibit germination of spores from 7 to 10-day old cultures of *Alternaria oleracea* and *Monilinia fructicola*. These concentrations refer to initial concentrations before diluting 4 volumes with 1 volume of spore stimulant and spore suspension. Germination records are taken after 20 hours of incubation at 22° C. by counting 100 spores. Results indicate that concentrations of less than 100 p.p.m. afford disease control for both the *A. oleracea* and *M. fructicola*.

EXAMPLE 4

A tomato foliage disease test is conducted measuring the ability of the product of Example 1 to protect tomato foliage against infection by the early blight fungus, Alternaria solani. Tomato plants 5 to 7 inches high of the variety Bonny Best are employed. The plants are sprayed with 100 ml. of test formulation (400 p.p.m. product of Example 1—5% acetone—0.01% Triton X-155—balance water) at 40 lbs. air pressure while being rotated on a turntable in a spray chamber. After the spray deposit is dry, the treated plants and comparable untreated controls are sprayed with a spore suspension containing approximately 20,000 conidia of A. solani per ml. The plants are held in a 100% humid atmosphere for 24 hours at 70° F. to permit spore germination and infection. After 2 to 4 days, significant disease control is observed.

EXAMPLE 5

Fungicidal utility is demonstrated by the ability of the product of Example 1 to protect tomato plants against the late blight fungus, Phytophthora infestans. The method employs tomato plants 5 to 7 inches high of the variety Bonny Best. 100 ml. of test formulations (2000 p.p.m. and 400 p.p.m. product of Example 1—5% acetone—0.01% Triton X-155—balance water) are sprayed on the plants at 40 lbs. air pressure while the plants are being rotated on a turntable in a spray chamber. After the spray deposit is dry, the treated plants and comparable untreated controls are sprayed with a solution containing approximately 150,000 sporangia of P. infestans per ml. The plants are held in a 100% humid atmosphere for 24 hours at 60° F. to permit spore germination and infection. After 2 to 4 days, lesion counts are made on the three uppermost fully expanded leaves. Comparing the number of lesions on the test plants and control plants shows disease control of greater than 95% on the test plants.

EXAMPLE 6

To evaluate bactericidal activity, the product of Example 1 is mixed with distilled water containing 5% acetone and 0.01% Triton X-155, at a concentration of 500 p.p.m. 5 ml. of the test formulation are put in each of 4 test tubes. To each test tube is added one of the organisms: Erwinia amylovora, Xanthomonas phaseoli, and Staphylococcus aureus in the form of a bacterial suspension in a saline solution from potato-dextrose agar plates. The tubes are then incubated for 4 hours at 30° C. Transfers are then made to sterile broth with a standard 4 mm. loop and the thus-innoculated broth is incubated for 48 hours at 37° C. Using this procedure the product of Example 1 affords 100%, 100%, and 60% control, respectively, for the above bacteria.

EXAMPLE 7

In order to make an in vitro evaluation of the product of Example 1 as a contact poison, nematodes (Panagrellus redivivus), are exposed to the test chemical in small watch glasses, (27 mm. diameter x 8 mm. deep), within a 9 cm. Petri dish. An aqueous test formulation (1000 p.p.m. product of Example 1–5% acetone—0.01% Triton X–155—balance water) is used. Results are recorded 24 hours after treatment and complete nematode control is observed.

EXAMPLE 8

*Preparation of 2,3-Dichloro-p-Oxathiane-4,4-Dioxide*

11.0 g. p-oxathiane-4,4-dioxide, 24.0 g. of sulfuryl chloride, 50 ml. of benzene and 0.2 g. of benzoyl peroxide are combined in a flask and refluxed for about 2 hours. An additional 0.2 g. of the peroxide is added and refluxing is continued for about 2 more hours. The reactant solution is reduced in volume by evaporation, leaving the desired product as colorless crystals, melting at about 128° to 134° C. This desired $C_4H_6Cl_2O_3$ is less than 1% soluble in water, xylene, and greater than 1% soluble in acetone.

EXAMPLE 9

Employing the fungicidal procedure given in Example 3, the product of Example 8 prevents spore germination at about 10 p.p.m. for the Alternaria oleracea and about 1000 p.p.m. for the Monilinia fructicola, respectively.

EXAMPLE 10

Employing the fungicidal procedure given in Example 5, the product of Example 8 at a concentration of 2000 p.p.m. affords greater than 40% disease control.

EXAMPLE 11

Employing the bactericidal procedure given in Example 6, the product of Example 8 at a concentration of 1000 p.p.m. affords 100% control for the Staphylococcus aureus, about 50% control for the Xanthomonas phaseoli, and less than 50% control for the Erwinia amylovora.

EXAMPLE 12

Employing the nematocidal procedure given in Example 7, the product of Example 8 affords 100% nematode control as a contact nematocide.

EXAMPLE 13

*Preparation of 2,3,6-Trichloro-p-Oxathiane-4,4-Dioxide*

100 g. (0.74 mol) of p-oxathiane-4,4-dioxide is mixed with about 3 liters of carbon tetrachloride. To this mixture chlorine is added at a rate of about 25 g./hr. over a period of about 14 hours. The reaction mixture is then vacuum distilled to remove the major proportion of carbon tetrachloride yielding a product melting at 125° to 129° C. This product is then recrystallized from chloroform to give the desired $C_4H_5Cl_3O_3S$ melting at 137° to 139° C. indicated through the following elemental analytical data:

| Element | Actual, percent by Weight | Calculated, percent by Weight for $C_4H_5Cl_3O_3S$ |
| --- | --- | --- |
| C | 20.2 | 20.0 |
| H | 2.0 | 2.1 |
| Cl | 42.8 | 44.4 |

This compound is less than 5% soluble in water at room temperature and greater than 5% soluble in acetone, cyclohexanone, and xylene.

EXAMPLE 14

Employing the procedure given in Example 2, the product of Example 8 kills more than 50% of the roaches.

EXAMPLE 15

Employing the fungicidal procedure given as Example 3, the product of Example 13 prevents spore germination of Alternaria oleracea at about 10 p.p.m. and at about 100 p.p.m. for Monilinia fructicola.

EXAMPLE 16

Employing the fungicidal procedure given as Example 4, the product of Example 13 affords greater than 85% fungus control at a concentration of 400 p.p.m.

EXAMPLE 17

The following test measures the ability of the product of Example 13 to protect pea seed and seedlings from seed decay and damping off fungi (Pythium and Fusarium). In this test, infested soil in 4 x 4 x 3-inch plant band boxes is treated by a soil drench-mix method at a rate equivalent to 128 lbs./acre. Treatment is accomplished by pouring 70 ml. of a formulation (2000 p.p.m. product of Example 13—5% acetone—0.01% Triton X-155) on the surface of the soil. This is allowed to stand until the next day when the soil is removed from each box and thoroughly mixed before being replaced in the box. Three days after treatment, 25 pea seeds, variety Perfection, are planted to a uniform depth per box. Untreated checks and standardized materials are included in each test in addition to a check planted in sterilized soil. Percentage stand recorded 14 days after planting indicates complete disease control at the above concentration.

EXAMPLE 18

Employing the procedure given in Example 6, the product of Example 13 affords 100% bacteria control for the *Erwinia amylovora, Xanthomonas phaseoli*, and *Staphylococcus aureus*.

EXAMPLE 19

To test phytotoxic effects, tomato plants, variety Bonny Best, 5 to 7 inches tall; corn, variety Cornell M-1 (field corn), 4 to 6 inches tall; bean, variety Tendergreen, just as the trifoliate leaves are beginning to unfold; and oats, variety Clinton, 3 to 5 inches tall, are sprayed with an aqueous formulation (6400 p.p.m. product of Example 13—5% acetone—0.01% Triton X–155—balance water). The plants are sprayed with 100 ml. of this formulation at 40 lbs. air pressure while being rotated on a turntable in a spray hood. Records are taken 14 days after treatment and phytotoxicity is rated on a scale from 0 for no injury to 11 for plant kill. Using this procedure, results indicate the product of Example 13 receives ratings of 11 for the tomato, 10 for the bean, 3 for the corn and 2 for the oats.

EXAMPLE 20

To detect root absorption and translocation, tomato plants, variety Bonny Best, 5 to 7 inches tall, and corn plants, variety Cornell M-1 (field corn), 4 to 6 inches tall, are treated by pouring 51 ml. of an aqueous test formulation (2000 p.p.m. product of Example 13—5% acetone—0.01% Triton X–155—balance water) onto the soil of 4 inch pots (102 mg./pot or approximately equivalent to 128 lbs./acre) in which the plants are growing. Plants are held under controlled greenhouse conditions for at least ten days before examination, after which phytotoxicity ratings are given based on a scale from 0 for no injury to 11 for plant kill. Employing this procedure, results indicate ratings of 11 for the tomato and 0 for the corn.

EXAMPLE 21

To evaluate the effect of the product of Example 13 upon the germination of seeds in soil, a mixture of seed of six crop plants is broadcast in 8 x 8 x 2 inch metal cake pans filled to within ½ inch of the top with composted greenhouse soil. The seed is uniformly covered with about ¼ inch of soil and watered. After 24 hours, 80 ml. of an aqueous test formulation (320 mg. product of Example 13—5% acetone—0.01% Triton X—155—balance water) is spread uniformly over the surface of the pan. This is equivalent to 64 lbs./acre. The seed mixture contains representatives of three broadleafs: turnip, flax and alfalfa, and three grasses: wheat, millet, and rye grass. Two weeks after treatment records are taken on seedling stand as compared to the controls. Using this procedure, results indicate 30% stand for the broadleaf species and 40% stand for the grass species.

EXAMPLE 22

Employing the nematocidal procedure given in Example 7, the product of Example 13 affords 100% nematode control at a concentration of 500 p.p.m.

EXAMPLE 23

*Preparation of 2-Chloro-p-Oxathiene-4,4-Dioxide*

The product of Example 1 is heated to its melting point, thereby evolving hydrogen chloride and producing 2-chloro-p-oxathiene-4,4-dioxide, $C_4H_5ClO_3S$, melting at 130° to 133° C.

EXAMPLE 24

*Preparation of 2,3-Dichloro-p-Oxathiane-4,4-Dioxide*

11.0 g. of p-oxathiane-4,4-dioxide, 24.0 g. of sulfuryl chloride, 50 ml. of chloroform, and 0.2 g. of benzoyl peroxide are combined in a flask and refluxed for about 12 hours. An additional 0.2 g. of peroxide is added and refluxing is continued for an additional 2 hours. The volume of the reactant solution is then reduced by evaporation, leaving the desired colorless product, $C_4H_6Cl_2O_3S$, melting at 128° to 134° C.

EXAMPLE 25

In order to compare the biological activity of p-oxathiane-4,4-dioxide with the biological activity of the compounds of this invention, a comparative test is run employing the procedure given in Example 5. The results indicate that a concentration of 400 p.p.m. of p-oxathiane-4,4-dioxide affords 0% control; whereas the product of Example 1 affords 99% control; the product of Example 8 affords 2% control; and the product of Example 13 affords 88% control, thus demonstrating a surprising difference in activity.

It is to be understood that although the invention has been described with specific reference to particular embodiments thereof, it is not to be so limited; changes and alterations therein may be made which are within the full intended scope of this invention as defined by the appended claims.

What is claimed is:
1. A compound of the structure:

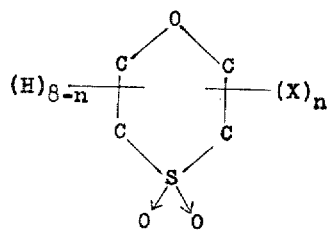

wherein X is halogen and *n* is a number from 1 to 8, inclusive.

2. A compound of the structure:

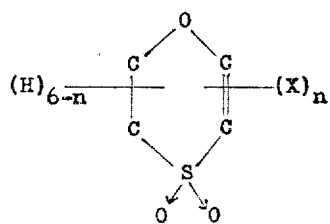

wherein X is halogen and *n* is a number from 1 to 6, inclusive.

3. Polychloro-p-oxathiane-4,4-dioxide.
4. Polychloro-p-oxathiene-4,4-dioxide.
5. 2,6-dichloro-p-oxathiane-4,4-dioxide.
6. 2,3,6-trichloro-p-oxathiane-4,4-dioxide.
7. 2,3-dichloro-p-oxathiane-4,4-dioxide.
8. 2-chloro-p-oxathiene-4,4-dioxide.
9. 2,5-dichloro-p-oxathiane-4,4-dioxide.
10. 2-chloro-p-oxathiane-4,4-dioxide.

References Cited in the file of this patent

UNITED STATES PATENTS

| | | |
|---|---|---|
| 2,097,726 | Grotowsky | Nov. 2, 1937 |
| 2,273,905 | Smith et al. | Feb. 24, 1942 |
| 2,662,086 | Hughes et al. | Dec. 8, 1953 |
| 2,725,331 | Haubein | Nov. 29, 1955 |
| 2,766,169 | Haubein | Oct. 9, 1956 |
| 2,833,688 | Gaertner | May 6, 1958 |
| 2,928,766 | Rosen | Mar. 15, 1960 |

UNITED STATES PATENT OFFICE
CERTIFICATE OF CORRECTION

Patent No. 3,082,214                        March 19, 1963

Henry Bluestone

It is hereby certified that error appears in the above numbered patent requiring correction and that the said Letters Patent should read as corrected below.

Column 4, line 60, and lines 67 and 68, for "-oxathiene", each occurrence, read -- -oxathiane --; column 8, line 1, for "$C_4H_6Cl_2O_3$" read -- $C_4H_6Cl_2O_3S$ --; column 9, line 74, for "$C_4H_5ClO_3S$" read -- $C_4H_5ClO_3S$ --.

Signed and sealed this 1st day of October 1963.

(SEAL)
Attest:

ERNEST W. SWIDER

Attesting Officer

DAVID L. LADD

Commissioner of Patents